(No Model.)
R. H. MATHER.
DYNAMO ELECTRIC MACHINE.
No. 302,418. Patented July 22, 1884.
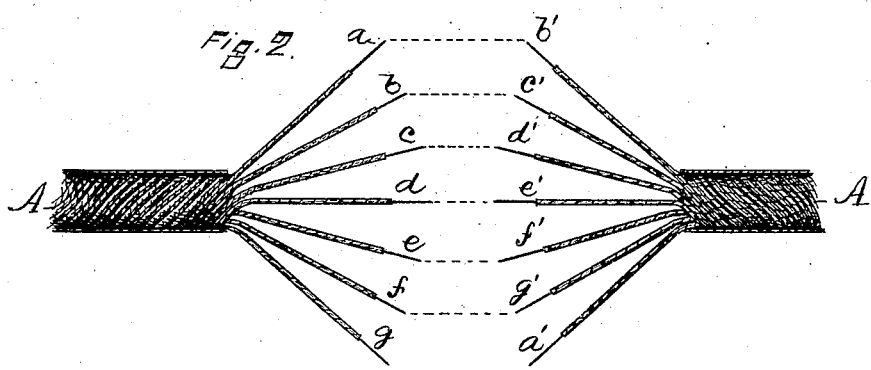
Witnesses.
John Edwards Jr.
Martin A. Pond
Inventor.
Richard H. Mather.
By James Shepard
Atty.

UNITED STATES PATENT OFFICE.

RICHARD H. MATHER, OF WINDSOR, CONNECTICUT.

DYNAMO-ELECTRIC MACHINE.

SPECIFICATION forming part of Letters Patent No. 302,418, dated July 22, 1884.

Application filed December 7, 1883. (No model.)

*To all whom it may concern:*

Be it known that I, RICHARD H. MATHER, a citizen of the United States, residing at Windsor, (post-office address Hartford,) in the county of Hartford and State of Connecticut, have invented certain new and useful Improvements in Dynamo-Electric Machines, of which the following is a specification.

My invention relates to improvements in dynamo-electric machines; and it has for its object the winding of the magnet more expeditiously than has heretofore been practiced. I attain this object by the simple construction illustrated in the accompanying drawings, in which—

Figure 1 is a perspective view of my machine, showing a part of the covering broken open and the ends of the wire with which the magnet is wound protruding through the covering. Fig. 2 is an enlarged detached view of the two ends of the cable with which the magnet of my machine is wound.

So far as I am aware, it has heretofore been customary to wind these magnets with one continuous wire, and as this wire is of great length the winding of it upon a ring-magnet is very laborious. Instead of a single wire for winding this ring-magnet, I employ a cable composed of a series of insulated wires, and after winding I connect their respective ends, so that they form practically one continuous wire.

In the drawings I have represented this cable A as composed of seven separate insulated wires. $a$, $b$, $c$, $d$, $e$, $f$, and $g$ designate, respectively, one end of these wires, while the corresponding letters with the character ' affixed thereto designate, respectively, the opposite ends of the same wires. The magnet-ring is wound with this cable in the usual way of winding it with wire, and after the desired length of the cable is wound upon the ring its two ends are brought together, and the end $a$ of the first wire is secured to the end $b'$ of the second wire, while the opposite end, $b$, of the second wire is secured to the end $c'$ of the next wire, and so on throughout the series, until the last wire is reached, when its end $g$ is left free, the end $g$ and the end $a'$ forming the ends of the magnet-coil, whereby the same effect is produced as if a single wire seven times as long as the cable had been wound upon the magnet. To thus wind the magnet with the cable requires only about one-seventh of the time heretofore required to wind the magnet with the same amount of wire. The cable is formed of a series of wires containing a greater or less number of separate wires, as may be desired.

I claim as my invention—

The ring-magnet of an electric machine, wound with a cable composed of a series of insulated wires having their ends connected together for forming one continuous wire longer than the cable, substantially as described, and for the purpose specified.

RICHARD H. MATHER.

Witnesses:
 HIRAM WILLEY,
 CHAS. A. SAFFORD.